Inventor
A.D.L. HUTCHINSON
By
Cook & Robinson
Attorney

Dec. 2, 1952     A. D. L. HUTCHINSON     2,620,225
BODY CONTROL MECHANISM FOR DUMP TRUCKS
Filed Jan. 17, 1949     4 Sheets-Sheet 2
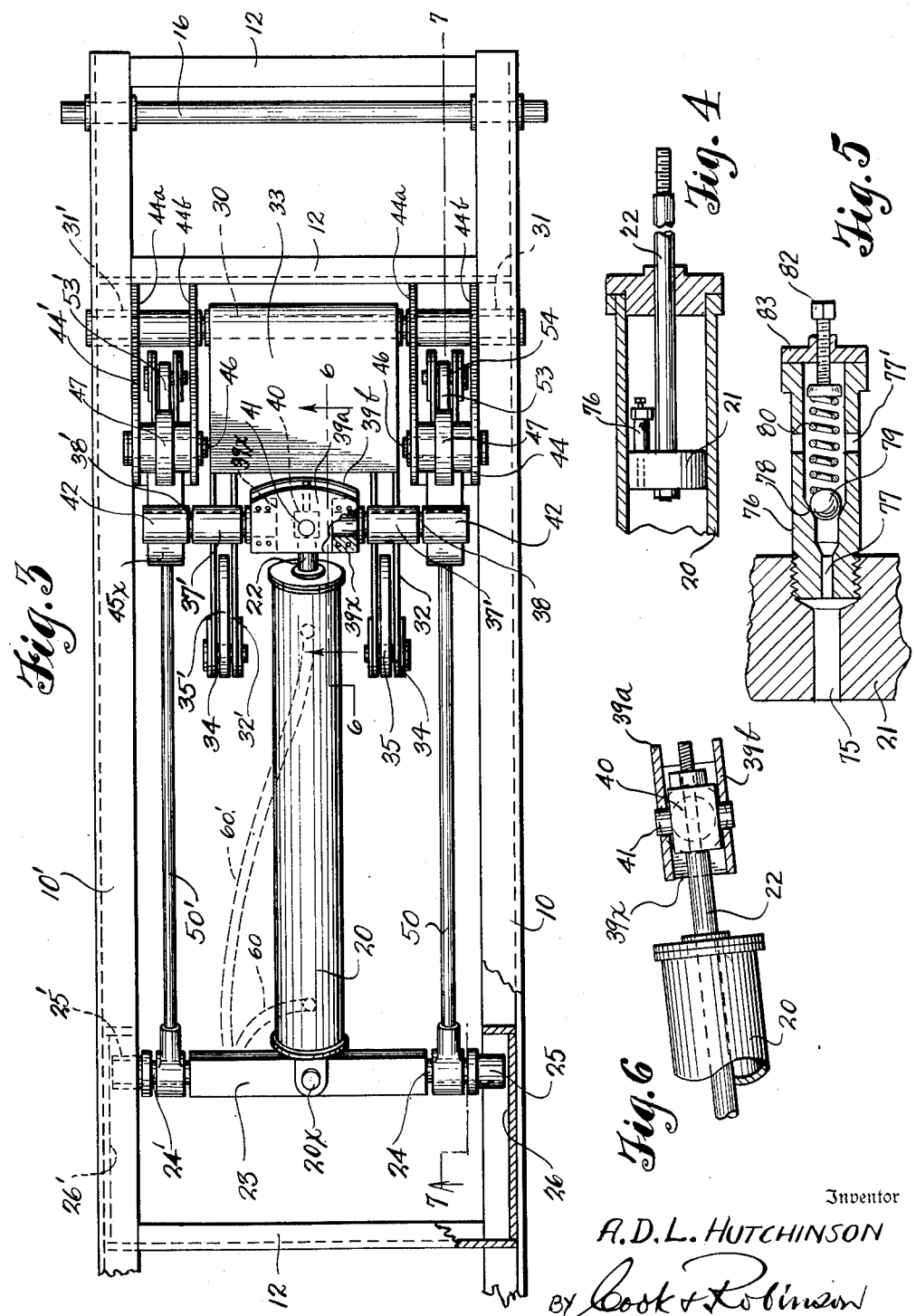
Inventor
A.D.L. HUTCHINSON
By Cook & Robinson
Attorney

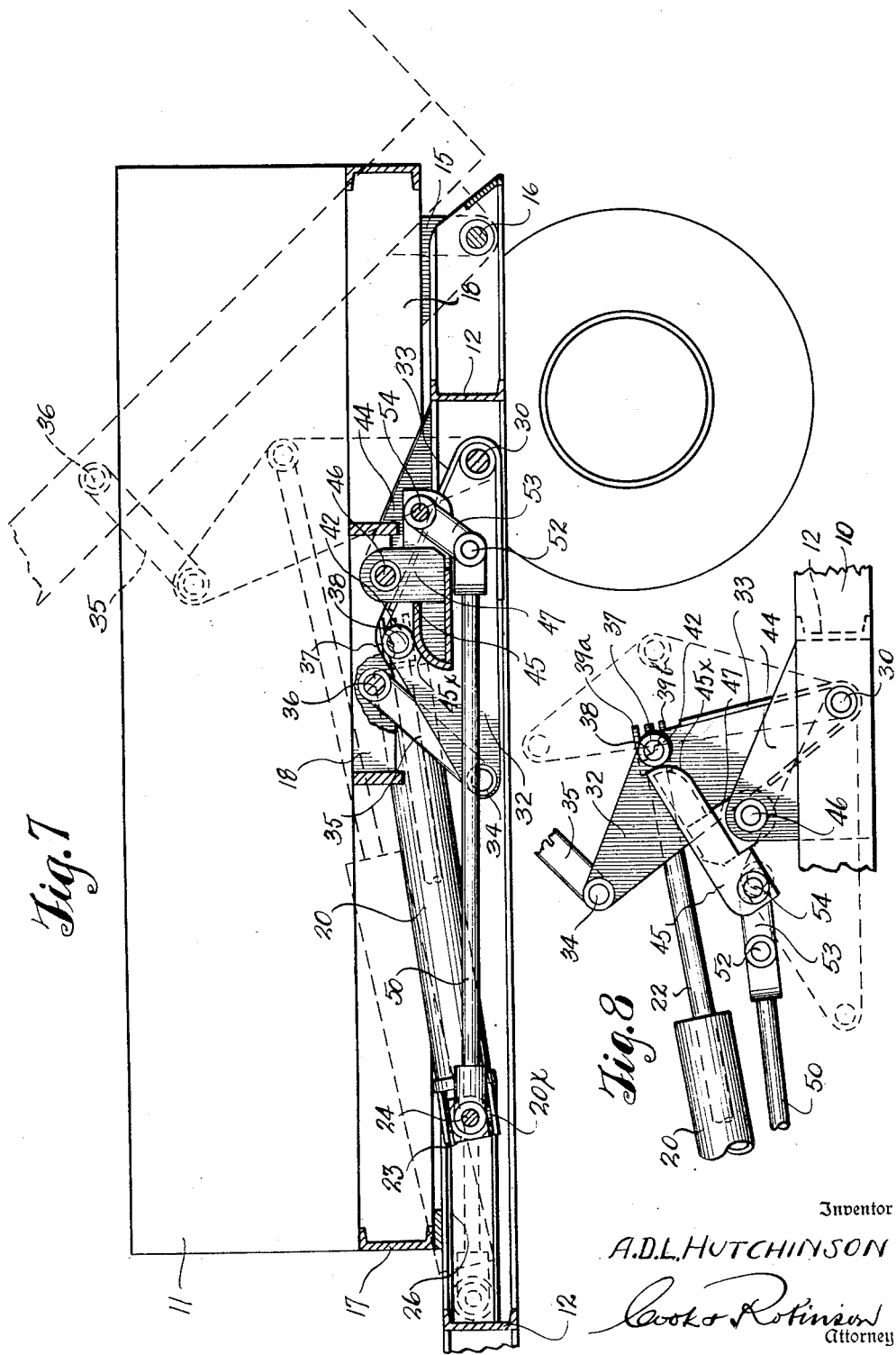

Dec. 2, 1952 A. D. L. HUTCHINSON 2,620,225
BODY CONTROL MECHANISM FOR DUMP TRUCKS
Filed Jan. 17, 1949 4 Sheets-Sheet 4

Inventor
ARCHIBALD D. L. HUTCHINSON
Cook & Robinson
Attorney

Patented Dec. 2, 1952

2,620,225

UNITED STATES PATENT OFFICE 2,620,225

BODY CONTROL MECHANISM FOR DUMP TRUCKS

Archibald D. L. Hutchinson, Seattle, Wash.

Application January 17, 1949, Serial No. 71,311

8 Claims. (Cl. 298—22)

This invention relates to improvements in dump trucks and other vehicles wherein a load carrying body is hingedly mounted upon a supporting chassis or frame and is adapted to be actuated between loading and load dumping positions by mechanisms used in conjunction with a hydraulic jack. More specifically stated, the present invention relates to the combination, relationship and mode of operation of devices used for effecting and controlling the movements of the dump body between raised and lowered positions and for protecting the body dumping mechanisms and supporting chassis against abnormal strain and shock; the present invention being in the nature of an improvement upon and an addition to mechanisms of the type of that of my copending application filed under Serial No. 733,079 on March 7, 1947 which became Patent No. 2,581,662 on January 8, 1952.

To impart a better understanding of my invention, it will here be explained that it is common in present day dump trucks, to employ a hydraulic jack for the raising of the dump body from loading to dumping position, and for holding it at various elevations. In some of such vehicles, it has been found quite advantageous to locate a lifting jack directly beneath the dump body. However, with the jack in this particular location, it is necessary, in order not to impair road clearance, that it be substantially horizontally disposed when the body is in a lowered position; and in this position, where the leverage is at a great disadvantage, the power required to start the lifting operation is considerably more than that required to move the load upward after a certain upward starting movement, or to hold the load in a lifted position. This requirement for great intial power has necessiated the use of jack cylinders of increased diameter and of exceedingly heavy construction, which is undesirable due to increased costs, increased weight, and resultant construction difficulties and disadvantages.

It has also been observed that in dump trucks using hydraulic jacks for the dumping operations, especially in mechanisms of the present character, the linkage and shafts of the body dumping mechanism, as well as the piston rod and cylinder mountings and supporting chassis, are subjected to excessive strain whenever the loaded body is abruptly stopped during a lowering operation, or should the vehicle be suddenly stopped while traveling with loaded body in raised position, or traveling over rough terrain. Such strain has added to the necessity for the use of oversized parts, with an incident increase in manufacturing costs and over-all weight of the vehicle. In view of these particular observations, it has been the principal object of this invention to provide the hydraulic system with a pressure relief valve which functions as a shock absorbing means, and by reason of its use and mode of application in the system, eliminates the requirement for use of parts that are oversize and overweight.

It is also an object of the invention to provide improvements in dump body mechanisms of that kind disclosed in my copending application, above mentioned, and to employ a shock absorbing relief valve therein.

Another object of my invention is to provide a body dumping mechanism in which the double acting effect of a hydraulic jack is advantageously employed with a novel use of linkage in connection therewith whereby a substantial amount of the initial force of the double acting jack is applied as a direct upward lift on the dump body to compensate for the disadvantage of leverage in the operating connections at the start of the lifting operation.

Yet another object of the invention is to provide a rear dump body arrangement wherein the initial application of hydraulic power to the double acting jack for lifting a load results in a resisted forward travel of the jack cylinder, and this resisted travel of the cylinder, through the novel arrangement of links and levers, effects that direct upward application of lifting force against the body lifting levers that to some extent compensates for the disadvantage of leverage.

Still another object of the invention is to provide a shock absorbing, pressure relief valve in the hydraulic system of devices of this character as a means of by-passing pressure medium for the elimination of that excessive strain on the mechanism that is incident to sudden stops or suddenly checking drop of a lifted load, and which has been one reason for use of parts that are oversize and overweight.

In accomplishing the above mentioned and other objects of the invention, I have provided the improved details of construction, the preferred forms of which are illustrated in the accompanying drawings, wherein:

Fig. 3 is a plan view of the body dumping mechanism as applied to a truck frame, the body being omitted from this view.

Fig. 4 is a sectional detail of an end portion of the hydraulic jack, showing one location for applying a shock absorbing relief valve.

Fig. 5 is an enlarged sectional view of a shock relief valve as used in this invention.

Fig. 6 is a sectional view taken substantially on line 6—6 in Fig. 3, showing the manner of and means for connecting the jack piston rod to the body dumping arm.

Fig. 7 is a longitudinal sectional view, taken substantially on line 7—7 in Fig. 3, showing the relationship of the parts of the body dumping mechanism when the dump body is in lowered position.

Fig. 8 is a side elevation of a part of the hoist mechanism, in the position it assumes when the body is partly raised.

Figure 1:
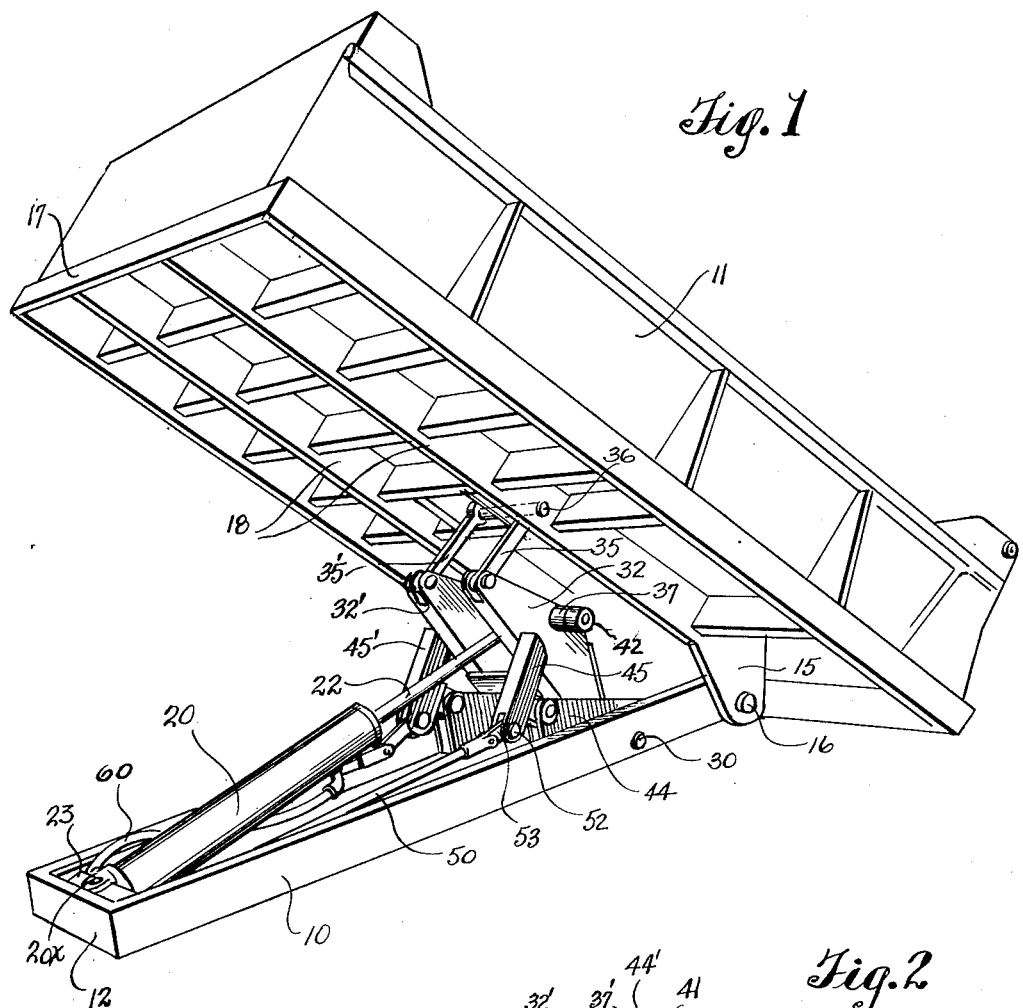
Fig. 1 is a perspective view showing a dump truck equipped with a body dumping mechanism embodied by this invention; the body being shown in dumping position.
Figure 2:
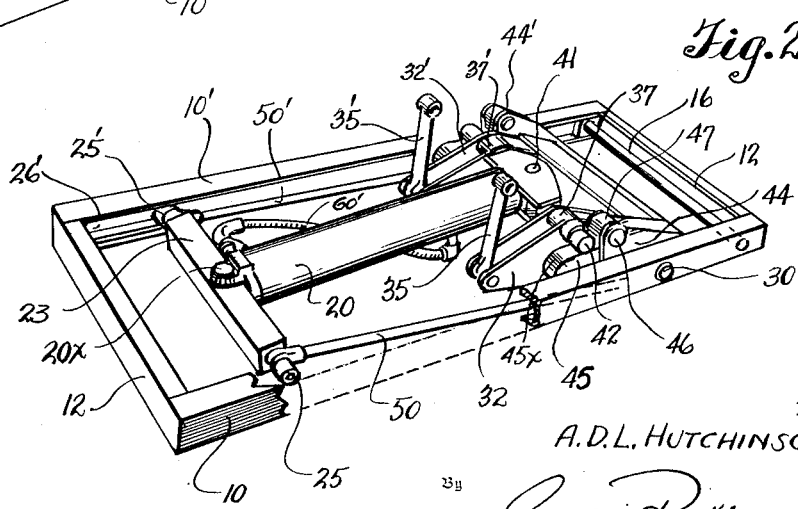
Fig. 2 is a perspective view showing the dumping mechanism in lowered position; the dump body not being shown.

Referring more in detail to the drawings:

10 and 10', respectively, designate the opposite, longitudinal side beams of a dump truck frame structure on which a dump body 11, which may be of any suitable kind, is mounted. As shown best in Fig. 3, the beams 10 and 10' are rigidly joined by a plurality of cross beams 12. The dump body 11, as here shown, is of that type designed and equipped for rear end dumping and it is mounted on the vehicle frame by transversely aligned brackets 15—15' that are hingedly mounted on a cross shaft 16 that extends between and is fixed to the side beams 10—10' at or near the rear end of the truck frame.

At its front end, the dump body is shown to include a transverse beam 17 that is adapted to rest upon the longitudinal beams 10 and 10' of the vehicle frame when the dump body is in a fully lowered position. Also, the floor of the dump body is here shown to comprise longitudinal base beams 18 to which floor the body operating linkage is attached, as presently will be explained.

The body dumping mechanism is shown as being located beneath the dump body 11 between the frame beams 10—10'. However, it is to be understood that some parts of this might be located outside these beams as may be required or found most practical for any particular vehicle.

The present dumping mechanism comprises a hydraulic cylinder 20 in which a piston 21 is reciprocally contained. A piston rod 22 is fixed to the piston and extends from the rear end of the cylinder. The cylinder 20 is mounted for vertical oscillation in the central longitudinal plane of the vehicle. At its forward end, it is secured by a pivot bolt 20x to a cross bar 23 that extends horizontally between the beams 10 and 10' of the truck frame. At its opposite ends, this cross bar 23 is equipped with stub shafts or trunnions 24—24' on which rollers 25—25' are mounted for guided forward and rearward travel in horizontal guideways 26—26' that are fixed, respectively, to the beams 10 and 10' at the insides thereof, as best shown in Fig. 3.

The guideways 26—26', as herein illustrated, are channel beams secured in the truck frame at opposite sides below the forward end portion of the truck body when it is in its lowered position.

Extended between the beams 10 and 10' near the rear end of the truck frame and forwardly of the body mounting shaft 16, is a cross shaft 30. This is rotatably contained at its opposite ends in bearings 31 and 31' that are fixed in the beams 10 and 10', respectively. Extended forwardly and perpendicularly from this cross shaft 30, are paired, spaced apart lever arms 32 and 32'. These arms lie in the same plane and are secured on and braced from shaft 30 by a web plate 33 as noted best in Fig. 3. This particular structure, made up of the arms 32—32' and plate 33, comprises what I will hereinafter refer to in the specification and claims as the body dumping arm. It is located symmetrically between the opposite side beams of the chassis to swing upwardly and downwardly about the axis of hinge shaft 30.

At their outer ends, the arms 32 and 32' are pivotally attached, by pivot pins 34, to the ends of links 35—35', and these links, in turn, are pivotally connected at their other ends, by pins 36, to the floor supporting frame structure of the dump body. When the dump body is moved from raised to lowered position, the dumping arm and jack cylinder swing toward each other to assume the positions of Fig. 7, at which they approach direct alignment. When the arms 32 and 32' are caused to swing upwardly incident to an application of body lifting force thereto, their link connections 35—35', with the dump body, will actuate the latter upwardly from its lowered position toward the dumping position of Fig. 1.

Medially of their ends, the arms 32—32' are provided with tubular bearings 37—37', in axial alignment transversely of the frame, and mounted in these bearings, respectively, are stub shafts 38 and 38', each of which extends to opposite sides of the arm in which it is mounted.

Extended between the inner ends of stub shafts 38 and 38' and fixed thereto, is a housing comprising upper and lower plates 39a and 39b joined in rigid, spaced relationship by blocks 39x (see Fig. 3) that are welded thereto between their end portions, and in which blocks the inner ends of the stub shafts 38—38' are fixed. Located between the plates 39a and 39b, centrally of the housing, is a block 40 secured by a vertical pivot 41. The outer end of the piston rod 22 is fixed in this block as shown best in Fig. 6, and thus an operating connection is provided between the jack and body dumping arm.

It has also been shown that each of the two lever arms 32 and 32' that extend forwardly from the cross shaft 30, is equipped between its ends, and at its outer side, with a lifting roller 42 that is revoluble on the outer end portion of the corresponding stub shaft 38 or 38'. Also, at opposite sides of the vehicle frame, and fixed to the beams 10—10', in transverse alignment, just forwardly of shaft 30, are housings 44—44' in which cam levers 45—45' are pivotally mounted. Each housing extends along the inside of the adjacent supporting beam and comprises parallel, spaced side walls, designated in Fig. 3 as 44a and 44b, between which walls the corresponding cam lever is pivotally mounted, by a supporting cross pin 46. These levers extend forwardly from the mounting pins and are adapted to swing in the vertical, longitudinal plane of their housings.

It will be observed by reference to Fig. 7 that the pivot pins 46 extend through the upper end portions of blocks 47 that are fixed in the cam levers about midway of their forward and rearward ends. It is to be observed also that when the dump body is in lowered position, the body lifting levers 32—32' extend forward from shaft 30 substantially horizontally and the cam levers 45—45' also extend forwardly and substantially horizontally, with their forward end portions underlying and engaged against the under sides of the corresponding rollers 42—42. Furthermore, it is shown that the cam levers 45—45' have forwardly and downwardly rounded camming surfaces, as at 45x, at their swinging ends, to be engaged in lifting contact with the corresponding rollers 42.

Extended along opposite sides of the vehicle frame, are links 50—50' which, at their forward ends, are attached pivotally to the trunnions 24—24' at opposite ends of the cross bar 23, and at their rearward ends, extend below the cam levers 45—45' and are pivotally connected, as at 52, to the lower end of short links 53—53' which, in turn, are pivotally attached at their upper ends, as at 54, to the rear ends of the corresponding cam levers 45—45'. The links 53 are limited in their forward swinging movement in their mounting levers 45—45' by engaging against the lower adjacent corners of the blocks 47 as noted in Fig. 7. With the cam levers 45—45' in position like that of Fig. 7, forward pull on the links 50—50' will cause the levers to pivot on their supports 46 and swing upwardly at their forward ends to supplement the force as applied through the piston rod 22, to swing the body dumping arm upwardly.

It is anticipated that a hydraulic pressure medium will be employed for actuation and control of the jack and that this medium may be applied to the opposite ends of the jack cylinder 20 preferably through flexible conduits, as shown at 60—60' in Fig. 3, and that the pressure medium be supplied to the conduits by a suitable pump mechanism under control of a hand valve as will presently be explained, or by other suitable means.

In this particular arrangement of parts, the hydraulic jack and the body dumping arm provide, in effect, a toggle joint linkage in which one leg of the toggle comprises the body dumping arm and the other the hydraulic jack as made up of the cylinder and the piston rod. The means whereby the outer ends of the legs of the toggle mechanism are joined comprises the levers 45—45' and the links 50—50'. When the toggle linkage is caused to straighten out, the body will be lowered. When the jack is caused to be extended by an application of pressure medium to its lower end, the toggle joint is caused to be upwardly broken. In the present instance, a part of the load lifting force is at this time sustained through the links 50—50' and this is transmitted through them to the pivoted cam levers as an upward lifting force against the toggle linkage that assists in overcoming that disadvantage in leverage inherent in the toggle linkage at the start of the lifting operation.

Assuming the body dumping mechanism to be so constructed, and with the understanding that when the body 11 is in lowered position the parts will assume the relative position in which they are shown in Fig. 7, wherein the jack is held in a rearwardly shifted position by the links 50—50', and the cylinder 20 and arms 32—32' are substantially in horizontal positions, it will be understood then that, should it be desired to raise the body to a dumping position, the hydraulic pressure medium will be admitted into the forward end of the jack cylinder to effect a relative extending of the piston rod from the cylinder. By reason of the present arrangement of parts and the almost directly opposed relationship of the jack and the body dumping arm at this time, the initial application of pressure medium to the jack will be double acting to the extent that it will cause the cylinder 20 to be pushed forwardly to some extent and the piston rod 22 extended therefrom to the extent permitted by the cylinder movement and resultant upward swing of the body dumping arm. In fact, there is a balancing of forces through the connections provided, as applied to the body dumping arm by the piston rod and the cam levers. The forward movement of the cylinder under this initial application of power moves the cross bar 23 accordingly, and this, through the pull of links 50—50', causes the two cam levers 45—45' to pivot on their supporting pins 46 and swing upwardly at their forward ends and, through the camming action of their rounded end surfaces acting against rollers 42, to exert a substantially direct upward lift on the levers 32—32' of the body dumping arm, which lifts the body through the mediacy of links 35—35' and actuates the dump body accordingly.

During this initial application of pressure medium to the jack cylinder, and the incident upward swing of the body dumping arm thus effected, the angular relationship of the cylinder 20 and body dumping arm will be established in accordance with the lifting of the body and changing conditions of leverage as the power is applied.

As the cylinder moves forwardly with the upward swing of the body, the lifting leverage of the arms 32—32', as supplied by the cam levers 45—45', decreases, and that supplied through the jack and piston rod increases. When the parts reach the position of Fig. 8, the levers 45—45' become ineffective for lifting, and the cylinder is held against farther forward movement. The jack then becomes single acting.

However, the angular relationship of the jack and body dumping arm is now advantageous and the lifting of the body can be easily completed in the usual manner and without necessitating any unusual amount of power.

The lowering of the body may be automatically effected by the weight therein on release of pressure medium from the lower end of the jack, or it may be forcibly accomplished by an application of pressure medium to the upper end of the cylinder. As the body moves from fully raised position toward lowered position, the rollers 42—42 on arms 32—32' engage with the cam levers 45—45' and then through them and the links 50—50', the jack cylinder is restored to its rearwardly shifted position of Fig. 1.

The main advantage of this linkage resides in the fact that the double acting effect of the jack provides for a direct upward application of lifting force through the cam levers 45—45' to the arms 32—32' to initially lift the body 11 to a position at which an advantageous lever relationship will be established through the connection of the piston rod and the body dumping arm. Thus, the need for exceedingly heavy cylinders, linkage and levers due to this disadvantage in leverage condition is reduced materially especially in so far as the hydraulic jack and associated mechanisms is concerned. The use of a cylinder of smaller diameter permits lowering the dump body closer to the frame, and this is also advantageous.

To eliminate excessive and damaging strain on the mechanism such as that which results, for example, from suddenly checking a heavily loaded body when being lowered from a lifted position, or that strain that is due to suddenly stopping the vehicle when traveling with the loaded body in raised position, I have incorporated a shock relief valve in the hydraulic system. This valve, which is used to by-pass pressure medium from the high pressure side of the system to the low pressure side, is preferably located in the piston of the hydraulic cylinder as shown in Fig. 4.

Figure 9:
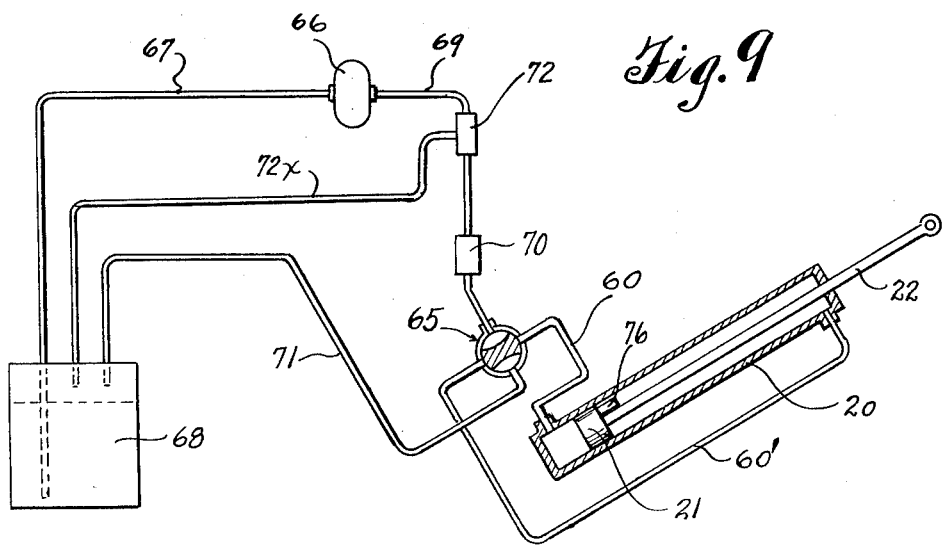
Fig. 9 is a diagrammatic illustration of the hydraulic control system.

This particular relief valve is not to be confused with the pressure relief valve as commonly used in the system to protect the pump and through which the pressure medium may be forced by the pump when the body control valve is set to hold the body at a definite position. In Fig. 9 I have diagrammatically illustrated a typical hydraulic system in which the present shock relief valve 76 is incorporated. In this view, the hydraulic cylinder 20 is shown to be connected at opposite ends by the conduits 60—60' with the diametrically opposite ports of a hand control valve 65 by which the direction of travel of the piston in the cylinder is determined and caused to be held at a set position. A hydraulic pump is designated by numeral 66. It is shown as being connected by a conduit 67 with a source of hydraulic medium designated at 68. The discharge side of the pump is connected by a conduit 69 through a check valve 70 and pressure relief valve 72 with one side of the control valve 65; there being a return pipe 71 leading from the valve 65 to the source of supply 68 of pressure medium. The pressure relief valve 72 is here shown as being so located as to by-pass the pressure medium from the high pressure side of the pump, through pipe 72x, to the supply tank 68.

The hand valve 65 is of a type that may be selectively set in positions to deliver the pressure medium from the pump, either to the lower end or to the upper end of the jack cylinder, and to permit return flow of medium therethrough from the other end. When the control valve 65 is set in a neutral or "hold" position, as in Fig. 9, it locks the pressure medium in both ends of the jack cylinder, thus to hold the piston 21 at a set position. The present use of the shock relief valve 76 is to take care of shock conditions that occur when the control valve is in this neutral position and the body is in a raised position.

One satisfactory place of application of the shock relief valve is to the jack piston. To do this the piston 21 is formed with a hole 75 therethrough, as seen in Fig. 5. Threaded into the hole is the inner end portion of the valve housing 76 having an end-to-end passage 77 formed with a valve seat 78 against which a ball valve 19 is held yieldingly seated by pressure of a spring 80. The spring bears at one end against the ball and at its other end is held in a cup 81 against which an adjusting screw 82 is engaged to adjust the holding force of the spring. The screw is threaded through a cap 83 that is applied to the outer end of the housing. The spring is placed under such tension that the valve withstands the load sustaining pressure of the hydraulic medium under all normal conditions of load. However, if subjected to a pressure that, if exceeded, might be detrimental or damaging to the hydraulic equipment, it permits the ball to be unseated and the damaging pressure to be relieved by flow of pressure medium past the ball valve into the passage 77 and through openings 77' in the housing into the upper end of the jack cylinder. In this way the danger of damage to parts of the mechanism by reason of shock or strain is avoided and the requirement for use of oversized or exceedingly heavy parts for this purpose is eliminated. In such a system, the relief valve 76 would be set to sustain higher pressure than relief valve 72.

The combined use of the present body dumping mechanism characterized by the use of the double acting jack and shock relieving valve 76 in the pressure system, has made it possible to reduce size and weight of essential parts without detriment to efficiency or life of mechanism. The reduction in size and weight is advantageous both from the standpoint of cost and operation.

In lieu of placing the valve 76 in the piston as shown, it might be connected at any place between pressure lines 60 and 60' and the same results effected.

Having thus described my invention, what I claim as new therein and desire to secure by Letters Patent is:

1. In a hydraulic system for raising and lowering a dump body, said system including a pressure supply means to deliver pressure medium from a supply to the hydraulic jack of the system, a control valve for selectively delivering the medium under pressure to either end of the jack and to return medium from the opposite end of the jack to the supply, a pressure relief valve and a back check valve, a shock relief valve normally closed to withstand the load sustaining pressure on the lifting side of the piston of the jack under all normal conditions of load, and opening when subjected to a pressure that would be damaging to the hydraulic system, so as to permit limited passage of pressure medium from the lifting side of the piston to the opposite side thereof, thus reducing the size and weight requirements of the components of the system.

2. In a hydraulic system for raising and lowering a dump body, said system including a pressure supply means to deliver pressure medium from a supply to the hydraulic jack of the system, a control valve for selectively delivering the medium under pressure to either end of the jack and to return medium from the opposite end of the jack to the supply, a pressure relief valve and a back check valve, a shock relief valve mounted in the piston of the hydraulic jack and normally closed to withstand the load sustaining pressure on the lifting side of the piston of the jack under all normal conditions of load, and opening when subjected to a pressure that would be damaging to the hydraulic system, so as to permit limited passage of pressure medium from the lifting side of the piston to the opposite side thereof, thus reducing the size and weight requirements of the components of the system.

3. In a dump truck; a horizontal frame structure, a dump body mounted thereon, a body actuating arm hinged to the frame structure and operatively connected to the dump body for its actuation between loading and dumping positions, a jack support mounted in the frame structure for movement toward and from the hinge axis of the body actuating arm, a jack pivotally mounted by the jack support and operatively connected with said body actuating arm; said jack and arm being adapted to swing toward each other with the lowering of the dump body and to closely approach alignment when the body reaches lowered position, a cam lever pivoted in the frame structure in position for applying a direct upward lift on said body actuating arm when the body is in its lowered position, and a link connecting the jack support and cam lever and through which lifting force applied by the jack will be sustained and transmitted in part to the cam lever and through the latter to the body actuating arm as an upward lifting force thereagainst.

4. A combination as recited in claim 3 wherein the said cam lever is so positioned that it will be engaged by the body dumping arm as the body moves from raised position to its lowered position, and thereby actuated about its pivotal mounting to cause the jack support to be pulled by said link toward the hinge axis of the body actuating arm.

5. A combination as recited in claim 3 wherein the cam lever is so positioned that it will be engaged by the body dumping arm as the body moves from raised position to its lowered position, and thereby actuated about its pivotal mounting to cause the jack support to be pulled by said link toward the hinge axis of the body actuating arm, and wherein forward movement of the jack support is permitted in accordance with the pivotal movement of the cam lever, in its application of upward lifting force to the dumping arm.

6. In a dump truck having a body supporting frame and a dump body hinged thereto; a body dumping mechanism comprising a body dumping arm hingedly fixed at one end to the said frame and having a lifting connection at its other end with said body, a double acting jack having supporting means at its forward end pivotally mounting it in said frame, said supporting means being adapted for movement toward and from the hinge axis of the said body dumping arm and said jack having an operating connection at its other end with said dumping arm; said jack and said dumping arm being adapted to swing toward each other about their pivot axes, and to closely approach alignment with the movement of said dump body to its loading position, cam rollers on the dumping arm at opposite sides, cam levers pivotally mounted in the supporting frame in positions to engage at their forward ends with the cam rollers for application of lifting force to the dumping arm, links connecting the jack supporting means and the rear ends of the cam levers and through which the body lifting forces, as sustained by the jack support, are transmitted to the cam levers, and through them to the dumping arm.

7. In a dump truck; a frame structure, a dump body mounted thereon, a body dumping arm hinged in the frame structure and operatively connected to the dump body for its actuation between lowered and dumping positions, a jack mounted in the frame structure for limited movement toward and from the hinge axis of the body actuating arm, and operatively connected with said body dumping arm for its actuation by extending and retracting the jack; said jack and arm providing a toggle joint linkage and adapted to swing on their mountings toward each other with the lowering of the dump body, to positions closely approaching alignment, a lever pivoted in the frame structure in position for the application of an upward lifting force on the joint of the toggle linkage when the body is in its lowered position, and a link connecting the jack support and cam lever for actuation of the latter and through which lifting force sustained by the jack support will be transmitted, in part, to the cam lever for its actuation.

8. In a dump truck; a frame structure, a dump body mounted thereon, a toggle joint linkage for actuating the body from lowered to raised position, said toggle joint linkage comprising as one leg thereof a double acting hydraulic jack that is pivotally joined to the companion leg, said legs being mounted for relative movement at their outer ends toward and from each other; said toggle linkage being adapted to approach a straight line when the body is fully lowered; a cam lever pivoted in the frame, a link connecting said lever and the outer end of the jack; said cam lever being so positioned as to be engaged and actuated about its pivot by the toggle linkage as the body is lowered, to cause said link to effect a retractive adjustment of the jack, and to effect an application of upward force on the toggle joint as the force of the jack is applied to lift a load.

ARCHIBALD D. L. HUTCHINSON.

REFERENCES CITED

The following references are of record in the file of this patent:

UNITED STATES PATENTS

| Number | Name | Date |
|---|---|---|
| 1,374,888 | Smight | Apr. 12, 1921 |
| 1,421,469 | Heil | July 4, 1922 |
| 1,455,528 | Hansen | May 15, 1923 |
| 2,095,286 | Riach | Oct. 12, 1937 |
| 2,143,546 | Day | Jan. 10, 1939 |
| 2,319,840 | Barrett | May 25, 1943 |
| 2,326,594 | Wood | Aug. 10, 1943 |
| 2,378,409 | Joy | June 19, 1945 |
| 2,581,662 | Hutchinson | Jan. 8, 1952 |